United States Patent
Knebel et al.

(10) Patent No.: US 6,618,801 B1
(45) Date of Patent: Sep. 9, 2003

(54) METHOD AND APPARATUS FOR IMPLEMENTING TWO ARCHITECTURES IN A CHIP USING BUNDLES THAT CONTAIN MICROINSTRUCTIONS AND TEMPLATE INFORMATION

(75) Inventors: Patrick Knebel, Ft Collins, CO (US); Kevin David Safford, Fort Collins, CO (US); Donald Charles Soltis, Jr., Fort Collins, CO (US); Joel D Lamb, Ft Collins, CO (US); Stephen R. Undy, Ft Collins, CO (US); Russell C Brockmann, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/496,845

(22) Filed: Feb. 2, 2000

(51) Int. Cl.[7] .................................... G06F 15/00
(52) U.S. Cl. ........................ 712/215; 712/211
(58) Field of Search .................. 712/215, 209, 712/200, 227, 245

(56) References Cited

U.S. PATENT DOCUMENTS

| | | | |
|---|---|---|---|
| 5,613,117 A | * | 3/1997 | Davidson et al. ............ 717/144 |
| 5,859,999 A | | 1/1999 | Morris et al. |
| 5,860,017 A | | 1/1999 | Sharangpani et al. |
| 5,922,065 A | * | 7/1999 | Hull et al. .................... 712/24 |
| 6,237,077 B1 | * | 5/2001 | Sharangpani et al. ......... 712/24 |

OTHER PUBLICATIONS

Wolfe, A., "Patents shed light on Merced's Innards", Electronic Engineering Times, Feb. 15, 1999.

* cited by examiner

Primary Examiner—Eddie Chan
Assistant Examiner—Charles Harkness

(57) ABSTRACT

The present invention is a method for implementing two architectures on a single chip. The method uses a fetch engine to retrieve instructions. If the instructions are macroinstructions, then it decodes the macroinstructions into microinstructions, and then bundles those microinstructions using a bundler, within an emulation engine. The bundles are issued in parallel and dispatched to the execution engine and contain pre-decode bits so that the execution engine treats them as microinstructions. Before being transferred to the execution engine, the instructions may be held in a buffer. The method also selects between bundled microinstructions from the emulation engine and native microinstructions coming directly from the fetch engine, by using a multiplexor or other means. Both native microinstructions and bundled microinstructions may be held in the buffer. The method also sends additional information to the execution engine.

20 Claims, 2 Drawing Sheets

Figure 4     Bundle Format
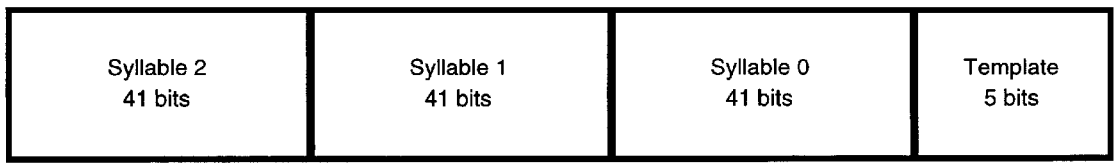
Figure 5     Bundler Rules
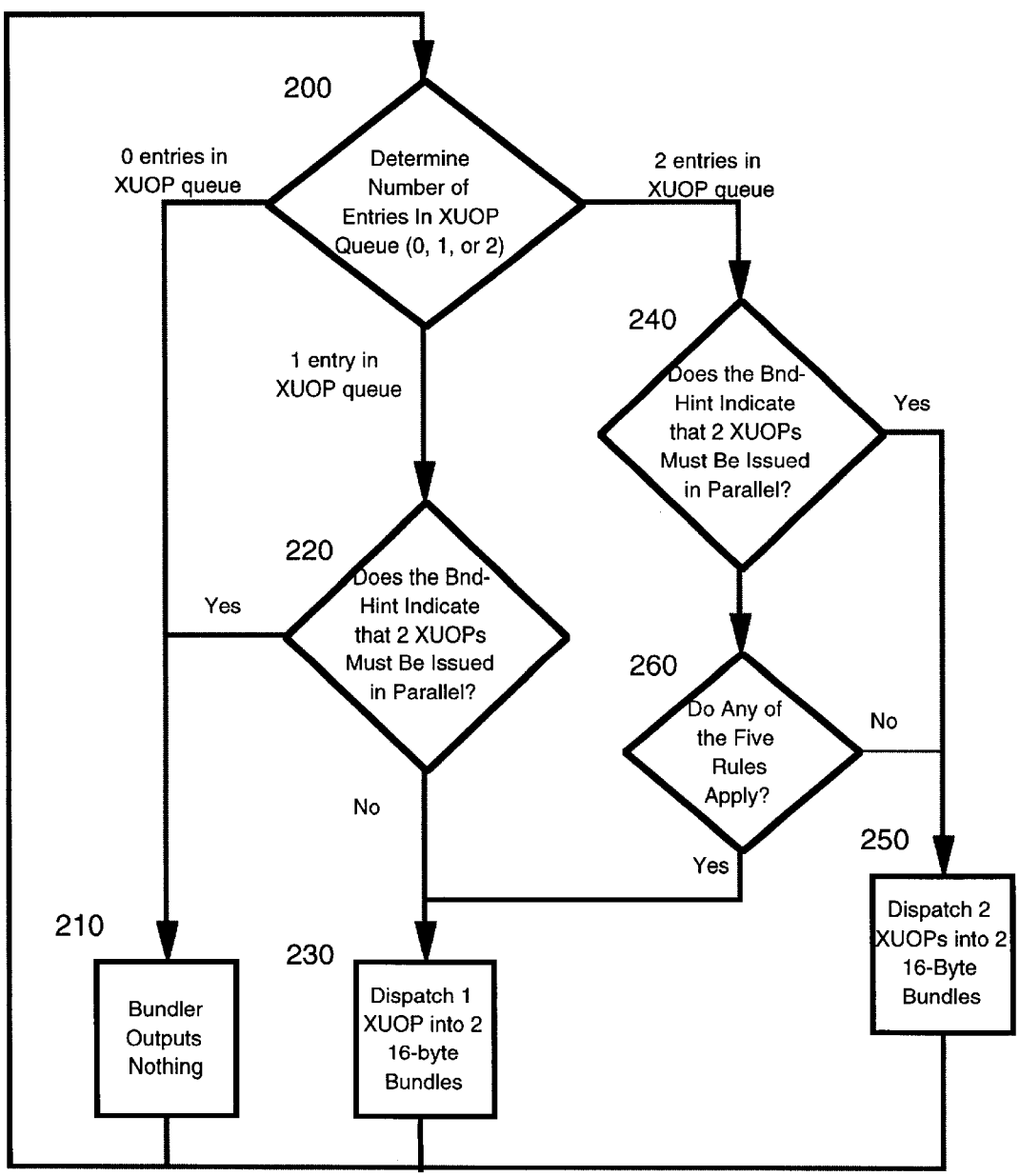

METHOD AND APPARATUS FOR IMPLEMENTING TWO ARCHITECTURES IN A CHIP USING BUNDLES THAT CONTAIN MICROINSTRUCTIONS AND TEMPLATE INFORMATION

FIELD

The present invention relates to digital computer systems, and more particularly but not by way of limitation, to methods and an apparatus for implementing two or more architectures on a chip.

BACKGROUND

Microprocessors exist that implement a reduced instruction set computing (RISC) instruction set architecture (ISA) and an independent complex instruction set computing (CISC) ISA by emulating the CISC instruction with instructions native to the RISC instruction set. Instructions from the CISC ISA are called "macroinstructions." Instructions from the RISC ISA are called "microinstructions."

Existing microprocessors do not implement these two architectures as efficiently as can be done. Some existing processors use more global wires routing data to many parts of the chip. This makes chip routing more difficult and less efficient. These techniques also complicate the timing and the pipeline of the processor. It is desirable to create an efficient means of implementing both architectures on a single chip, while leveraging existing hardware. In particular, it is desirable to localize processing and dispatching of the instructions, with minimal impact on the existing execution engine.

SUMMARY

The present invention is a method for implementing two architectures on a single chip. The method uses a fetch engine to retrieve instructions. If the instructions are macroinstructions, then it decodes the macroinstructions into microinstructions, and then bundles those microinstructions using a bundler, within an emulation engine. The bundles are issued in parallel and dispatched to the execution engine and contain pre-decode bits so that the execution engine treats them as microinstructions. Before being transferred to the execution engine, the instructions may be held in a buffer. The method also selects between bundled microinstructions from the emulation engine and native microinstructions coming directly from the fetch engine, by using a multiplexor or other means. Both native microinstructions and bundled microinstructions may be held in the buffer. The method also sends additional information to the execution engine.

The present invention is also a computer system having a processor capable of implementing two architectures. The computer system has a fetch engine to retrieve instructions, an execution engine to execute the instructions, and an emulation engine to decode macroinstructions into microinstructions before their execution. The emulation engine uses a bundler to bundle microinstructions and other information into groups. These bundles are delivered to the execution engine in parallel.

SUMMARY OF DRAWINGS

FIG. 4 is a block diagram showing the bundle format.

FIG. 5 is a flow chart showing the operation of the bundler.

DETAILED DESCRIPTION

A. RISC Microprocessor

Figure 1:
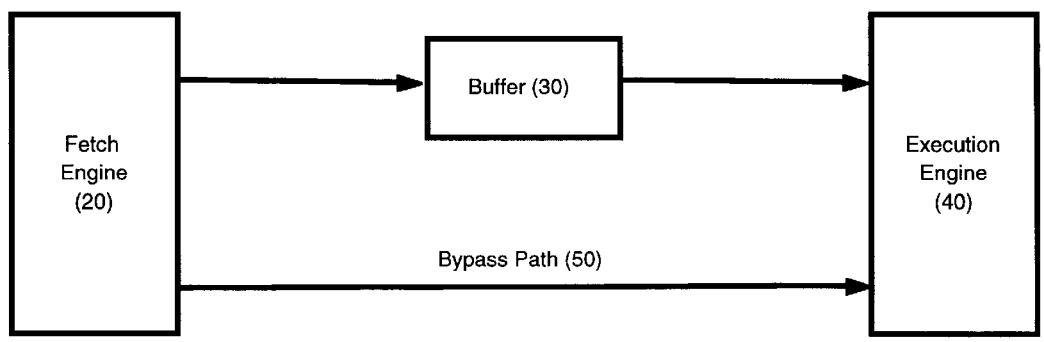
FIG. 1 is a block diagram of a RISC microprocessor.

In a very simplistic sense, a RISC microprocessor can be divided into two portions: an instruction-fetch engine and an execution engine. FIG. 1 shows a block diagram of a RISC microprocessor 10, having a fetch engine 20 and an execution engine 40. In some implementations such as the implementation shown in FIG. 1, the fetch engine is separated from the execution engine by a buffer 30. This buffer 30, also referred to as a queue, can be used to decouple the fetch engine 20 from the execution engine 40. While the fetch engine 20 writes new, incoming instruction into the buffer 30, the execution engine 40 reads and retires instructions from the buffer 30 in the same order as they were written. As long as there is room in the buffer 30, fetch engine 20 can get ahead of the execution engine 40. Once the buffer 30 fills, the fetch engine 20 must stall and wait for the execution engine 40 to take an instruction and free up a slot in the buffer 30. If the buffer 30 is empty, though, it is possible to create a bypass path 50 around the buffer 30 so that newly fetched instructions may pass from the fetch engine 20 directly to the execution engine 40 without first being written into the buffer 30.

Figure 2:
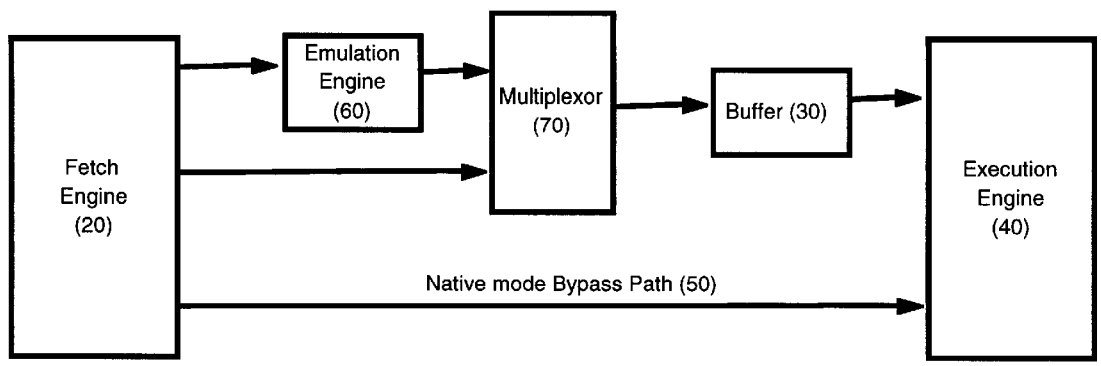
FIG. 2 is a block diagram of a RISC microprocessor showing further details of processing RISC and CISC instructions.

The present invention emulates a CISC ISA on a RISC machine. FIG. 2 shows a block diagram of a RISC microprocessor 10 after implementation of the present invention. To implement the present invention, an emulation engine 60 is required to convert a stream of instruction bytes into a sequence of microinstructions that can be understood by the RISC execution engine 40. As shown in FIG. 2, the emulation engine 60 receives an instruction stream from the fetch engine 20 and delivers the microinstructions to the execution engine 40. In a preferred embodiment, the present invention uses a multiplexor 70 to select instructions from either the fetch engine 20 or from the emulation engine 60. The multiplexor 70 then places the selected instructions into the instruction buffer 30. The emulation engine 60 does not have a bypass path 50 around the instruction buffer 30 because adding a bypass path 50 would cause the machine to operate at a lower frequency even when executing in native (RISC) mode.

When executing in native mode, the fetch engine 20 delivers 32 bytes of instruction stream to the execution engine 40. Within each 16 bytes, or "bundle," the RISC ISA defines there to be three 41-bit instructions and five bits of template information. In addition, the fetch engine 20 sends other control information, called pre-decode bits, that it decodes from the 16 bytes of the instruction stream. The pre-decode bits are used by the execution engine 40 to help it efficiently distribute the six instructions to the proper execution units.

When executing in emulation mode, it is necessary for the execution engine 40 to receive data in exactly the same format as it does in native mode. This allows the vast majority of the execution engine 40 to be designed only for native mode execution, while allowing it also to be used when in emulation mode. Thus, the emulation engine 60 must also deliver 32 bytes of instruction data along with the pre-decode bits calculated from those 32 bytes.

As stated above, there are six native mode instructions contained in the 32 bytes of instruction stream. However, the performance requirements of this machine are such that in emulation mode, it is sufficient to deliver a maximum of two native mode instructions per cycle to the execution engine 40. This simplifies the design of the emulation hardware because of the template encodings and the dependency requirements between instructions that are imposed by the RISC ISA. By placing only one instruction and two NOPs together per bundle, the emulation hardware has a much easier job of adhering to these architectural requirements.

B. The Bundler

Figure 3:
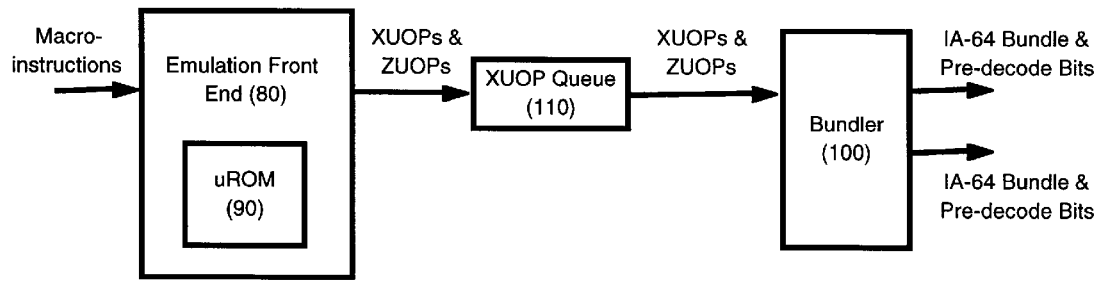
FIG. 3 is a block diagram of an emulation engine.

As noted above, the present invention operates by the use of a bundler 100. The bundler 100 is part of the emulation engine 60. FIG. 3 is a block diagram showing parts of an emulation engine 60, having an emulation front end 80 and a bundler 100. The emulation engine 60 processes a sequence of operations (XUOPs). Between the emulation front end 80 and the bundler 100 is an XUOP queue 110, also referred to as an XUOP buffer. Within the emulation front end 80 is a microcode ROM (uROM) 90. The uROM 90 delivers information to the bundler 100. The function of the bundler 100 is to take XUOPs and other information (including ZUOPs) delivered from the emulation front end 80 within the emulation engine 60, converts this information into a valid 16-byte bundle as defined by the RISC ISA, and deliver to the execution engine 40 two 16-byte bundles and associated pre-decode bits that can be decoded and executed in parallel without violating any architectural dependencies within the pair of bundles. FIG. 4 shows a bundle format, having three 41-bit Syllables and a 5-bit template.

The emulation front end 80 is required to deliver the following bits of information (referred to as "ZUOPs"), in addition to other information not described herein. These ZUOPs are to be used by the bundler 100 as it creates the two 16-byte bundles.

1. Syllable: 41-bit instruction that is understood by the execution engine 40.
2. Immediate: 32-bit immediate field that can be used as an operand.
3. Op-Type: 3-bit field specifying which functional units can execute this type of Syllable.
4. Sub-Type: 3-bit field specifying further information specific to a particular Op-Type.
5. Bnd-Hint: 2-bit field indicating certain dependency restrictions between this Syllable, its predecessor and successor Syllables.
6. Reg-Valid: 4-bit field specifying whether each of four separate fields within in the 41-bit Syllable contain valid register identifiers.

FIG. 5 shows the operation of the bundler 100 in determining how many XUOPs to issue. The bundler 100 issues either 0,1, or 2 XUOPs per issue-group. The bundler 100 attempts to issue two XUOPs at the same time, if possible. This determination is based on the number of XUOPs in the XUOP queue 110 and on the application of certain rules, described below. The bundler must first determine how many entries are in the XUOP queue 110, in a determination function 200. If the XUOP queue 110 has no entries, then the bundler 100 outputs nothing, as shown by the no XUOP output function 210.

If the XUOP queue 110 has one entry, then a determination function 220 determines whether the Bnd-Hint indicates that two XUOPs must be issued in parallel. If two XUOPs do not need to be issued in parallel, then the one XUOP in the XUOP queue 110 is dispatched into two 16-byte bundles in the one XUOP output function 230. If the determination function 220 determines that two XUOPs must be issued in parallel, then the bundler 100 outputs nothing in the no XUOP output function 210.

If the XUOP queue 110 has two entries, then a determination function 240 determines whether the Bnd-Hint indicates that two XUOPs must be issued in parallel. If the determination function 240 determines that 2 XUOPs must be issued in parallel, then two XUOPs are dispatched into two 16-byte bundles in the two XUOP output function 250. If the determination function 240 determines that two XUOPs are not required to be issued in parallel, then the determination function 260 determines whether any of the following five rules apply:

1. A specific bit in a machine specific register is set to restrict dual issue.
2. Both XUOP's are destined for the same execution unit, unless they are both floating point operations or if they are both "general" ALU operations.
3. Both XUOP's have a Sub-Type that indicates they modify floating point (FP)-stack resources.
4. Both XUOP's have a Sub-Type that indicates they could flush the pipeline based on a comparison result.
5. Comparing register fields that are indicated to be valid by the Reg-Valid bits shows that there is a register dependency hazard between two XUOP's.

If none of the five rules apply, then two XUOPs are dispatched into two 16-byte bundles in the two XUOP output function 250. If any of these five rules do apply, then one XUOP is dispatched into two 16-byte bundles, in the one XUOP output function 230.

C. Transferring Extra Information

In a preferred embodiment, the present invention also transfers extra information between the emulation engine 60 and the execution engine 40. In one embodiment, the 32-bit Immediate is transferred from the emulation front end 80 to the execution engine 40. The RISC ISA has a memory, long-immediate, integer template (MLI). In native mode this template specifies that the third Syllable within the 128-bit bundle is an integer instruction that operates on a 64-bit Immediate, 23 of which bits are contained in the third Syllable (I) and 41 of which bits are contained in the second Syllable (L). The execution engine 40 is designed to interpret the MLI template differently when in emulation mode. In emulation mode the third Syllable contains an integer instruction that operates on a 32-bit immediate, all of which is contained in the second Syllable. In one embodiment, the present invention uses the MLI template to send extra information between the emulation engine 60 and the execution engine 40.

In another embodiment of the present invention, extra information may be sent between the emulation engine 60 and the execution engine 40 for floating-point operations. For those operations, the bundler 100 generates an MFI template. The MFI template specifies that the first syllable within the 128-bit bundle is a memory instruction, the second syllable is a floating point instruction, and the third syllable is an integer instruction. When executing an FP instruction the second syllable contains an FP instruction, while the first and third syllables contain NOPs. In this case, extra bits of control information are sent to the execution engine as part of the NOP in the first Syllable. These bits of NOP Syllable are normally ignored in native mode, but they are treated specially by the execution engine 40 when in emulation mode.

Although the present invention has been described in detail with reference to certain embodiments thereof, variations are possible. For example, although the sizes of certain data, bundles, templates, and other specific information were given by way of example, these specifics are only by way of illustration. Therefore, the present invention may be embodied in other specific forms without departing from the essential spirit or attributes thereof. It is desired that the embodiments described herein be considered in all respects as illustrative, not restrictive, and that reference be made to the appended claims for determining the scope of the invention.

We claim:

1. A method for implementing two architectures on a chip, comprising:

decoding a macroinstruction into one or more microinstructions, through the use of an emulation engine, converting the one or more microinstructions into a bundle, using a bundler, the bundle having at least one syllable and having a template that specifies a type of data included in the bundle, wherein the emulation engine delivers a pre-decode bit to the execution engine along with the bundle, and wherein the bundler receives at least one sequence of instructions (an "XUOP"), determines how many of the at least one XUOP are received, and when more than one XUOP is received, determines whether the XUOPs must be issued in parallel, and when the XUOPs must be issued in parallel, issues a plurality of the bundles containing the XUOPs to the execution engine in parallel, when the XUOPs need not be issued in parallel, determines whether a particular problem exists, and when the problem does not exist, dispatches a plurality of the bundles containing the XUOPs to the execution engine in parallel, when the problem does exist, dispatches a plurality of the bundles containing one of the XUOPs to the execution engine, when only one XUOP is received, determines whether the one XUOP must be issued in parallel with another XUOP, and when the one XUOP must be issued in parallel, dispatches nothing to the execution engine, when the one XUOP need not be issued in parallel, dispatches the bundle containing the one XUOP to the execution engine, and dispatching the bundle to an execution engine together with a pre-decode bit.

2. The method of claim 1, further comprising, selecting the one or more microinstructions from a fetch engine or from the emulation engine, and delivering the one or more microinstructions to the execution engine.

3. The method of claim 1, wherein the bundler determines whether the particular problem exists by determining:

whether a specific bit in a machine-specific register is set to restrict dual issue;

whether the plurality of bundles to be dispatched in parallel are destined for the same execution unit and are not floating-point operations and are not general ALU operations;

whether the plurality of bundles have a sub-type that indicates that they modify floating-point stack resources;

whether the plurality of bundles have a sub-type that indicates they could flush a pipeline based on a comparison result; and whether a Reg-Valid bit associated with a register field indicates that a register dependency hazard exists between the plurality of bundles.

4. The method of claim 1, wherein the bundler receives additional information (a "ZUOP"), comprising:

a Syllable instruction, an Immediate field, an Op-Type field, a Sub-Type field, a Bnd-Hint field, and a Reg-Valid field.

5. The method of claim 1, wherein the template is an MLI template that is interpreted by the execution engine differently, depending upon whether the execution engine is operating in native mode or emulation mode.

6. The method of claim 1, wherein the template is an MFI template, wherein the MFI template specifies that the bundle includes a memory instruction in a first syllable, a floating point instruction in a second syllable, and an integer instruction in a third syllable.

7. A method for implementing two types of architectures on a chip, comprising:

(a) receiving an instruction from a fetch engine, (b) determining whether the instruction is a macroinstruction or a microinstruction, (c) if the instruction is a macroinstruction, (i) sending the macroinstruction to an emulation engine, (ii) decomposing the macroinstruction into one or more microinstructions, (iii) bundling the one or more microinstructions into at least one bundle with a bundler, wherein the bundle includes a template that specifies the type of data in the bundle, and wherein the bundler receives at least one sequence of instructions (an "XUOP"), determines how many XUOPs are received, and when more than one XUOP is received, determines whether the XUOPs must be issued in parallel, and when the XUOPs must be issued in parallel, issues a plurality of the bundles containing the XUOPs to the execution engine in parallel, when the XUOPs need not be issued in parallel, determines whether a particular problem exists, and when the problem does not exist, dispatches a plurality of the bundles containing the XUOPs to the execution engine in parallel, when the problem does exist, dispatches a plurality of the bundles containing one of the XUOPs to the execution engine, when only one XUOP is received, determines whether the one XUOP must be issued in parallel with another XUOP, and when the one XUOP must be issued in parallel, dispatches nothing to the execution engine, when the one XUOP need not be issued in parallel, dispatches the bundle containing the one XUOP to the execution engine, and (iv) dispatching the at least one bundle in parallel to an execution engine, the step of dispatching comprising dispatching a plurality of the bundles containing the XUOPs when a plurality of XUOPs are received and must be issued in parallel, and (d) if the instruction is a microinstruction, dispatching the microinstruction to the execution engine.

8. The method of claim 7, further comprising,
(a) selecting either the microinstruction from the fetch engine or the at least one bundle from the emulation engine, by using a multiplexor, and
(b) dispatching the selected instruction to the execution engine.

9. The method of claim 8, wherein the bundles have extra information contained within syllables, and wherein the extra information is dispatched to the execution engine.

10. The method of claim 9, wherein the extra information is contained within a NOP syllable.

11. The method of claim 7, wherein the template is interpreted by the execution engine differently, depending upon whether the execution engine is operating in native mode or emulation mode.

12. The method of claim 7, wherein the step of dispatching further comprises, when the plurality of XUOPs are received but do not need to issue in parallel,
determining whether a particular problem exists, and
dispatching a plurality bundles containing the XUOPs when the particular problem exists.

13. The method of claim 12, wherein the step of determining whether the particular problem exists comprises determining whether one or more of the following conditions exists:
a specific bit in a machine-specific register is set to restrict dual issue;
the plurality of bundles to be dispatched in parallel are destined for the same execution unit and are not floating-point operations and are not general ALU operations;
the plurality of bundles have a sub-type that indicates that they modify floating-point stack resources;
the plurality of bundles have a sub-type that indicates they could flush a pipeline based on a comparison result; and
a Reg-Valid bit associated with a register field indicates that a register dependency hazard exists between the plurality of bundles.

14. The method of claim 7, wherein the bundler receives additional information (a "ZUOP"), comprising:
a Syllable instruction,
an Immediate field, and
an Op-Type field.

15. The method of claim 7, wherein the bundler receives additional information (a "ZUOP"), comprising:
a Sub-Type field,
a Bnd-Hint field, and
a Reg-Valid field.

16. A computer system with a processor, comprising:
a fetch engine,
an emulation engine, comprising
a queue,
a bundler, and
an emulation front end,
an execution engine, and
a buffer capable of receiving instructions from the fetch engine or the emulation engine and delivering instructions to the execution engine, wherein the bundler:
receives sequences of instructions from the emulation front end,
converts each of the sequences into a plurality of bundles, each of the bundles including a template that specifies a type of data contained the bundle,
determines whether a plurality of the instructions must be issued in parallel, and
delivers the plurality of bundles to the execution engine, wherein the bundles are delivered in parallel when the instructions must be issued in parallel and when a particular problem exists.

17. The computer system of claim 16, wherein the bundler delivers a pre-decode bit to the execution engine, which pre-decode bit can be decoded in parallel with the delivered bundles.

18. The computer system of claim 16, wherein the emulation engine transfers additional information to the execution engine, the additional information including an immediate from an emulation front end that is sent by using an MLI template that is interpreted by the execution engine differently, depending upon whether the execution engine is operating in native mode or emulation mode.

19. The computer system of claim 16, wherein the emulation engine transfers additional information to the execution engine, the additional information including control information from the emulation front end that is sent using an MFI template, wherein the MFI template specifies that the bundle includes a memory instruction in a first syllable, a floating point instruction in a second syllable, and an integer instruction in a third syllable.

20. The computer system of claim 18, wherein, when the execution engine is operating in native mode, the MLI template specifies that a third syllable of the bundle contains an integer instruction that operates on an immediate located in second and third syllables of the bundle, and, when the execution engine is operating in emulation mode, the MLI template specifies that the third syllable of the bundle contains an integer instruction that operates on an immediate located entirely within the second syllable.

* * * * *